(12) United States Patent
Huang

(10) Patent No.: US 8,671,644 B2
(45) Date of Patent: Mar. 18, 2014

(54) SUPPORTING FRAME

(76) Inventor: Tsung-Chieh Huang, Kaohsiung (TW)

(*) Notice: Subject to any disclaimer, the term of this patent is extended or adjusted under 35 U.S.C. 154(b) by 24 days.

(21) Appl. No.: 13/476,029

(22) Filed: May 21, 2012

(65) Prior Publication Data

US 2013/0306808 A1 Nov. 21, 2013

(51) Int. Cl.
*E04H 12/00* (2006.01)
*F16B 7/04* (2006.01)
*A47B 91/00* (2006.01)

(52) U.S. Cl.
USPC ........ 52/653.2; 52/655.1; 52/656.9; 108/155; 108/186; 403/170; 403/172

(58) Field of Classification Search
USPC .............. 248/163.1, 220.1, 220.21, 188, 432, 248/440; 108/155, 153.1, 158.11, 180, 188, 108/190, 186, 192; 403/171, 172, 205, 327, 403/170, 173, 174, 292; 52/648.1, 653.1, 52/655.1, 655.2, 653.2, 656.1, 656.9
See application file for complete search history.

(56) References Cited

U.S. PATENT DOCUMENTS

| 4,027,987 | A | * | 6/1977 | Berkowitz | 403/172 |
| 4,630,550 | A | * | 12/1986 | Weitzman | 108/155 |
| 4,910,939 | A | * | 3/1990 | Cavanagh | 52/648.1 |
| 5,230,197 | A | * | 7/1993 | Hart | 52/653.2 |
| 5,590,974 | A | * | 1/1997 | Yang | 403/327 |
| 5,941,183 | A | * | 8/1999 | Ming-Shun | 108/153.1 |
| 5,966,890 | A | * | 10/1999 | Inman | 52/653.2 |

\* cited by examiner

*Primary Examiner* — Tan Le

(57) ABSTRACT

A supporting frame comprises four transversal supporting tubes, each of the transversal supporting tubes having two hollow ends; each two adjacent inner faces of each transversal supporting tube being formed with a screw hole; four longitudinal supporting tubes, each upper end of the longitudinal supporting tubes being a hollow end; moreover, each two adjacent inner faces of each longitudinal supporting tube being formed with respective screw holes; and a plurality of three-way internal connecting units; each three-way internal connecting unit having three inserting ends; each inserting end of the three-way internal connecting unit can be inserted into the hollow ends of the transversal supporting tube and the longitudinal supporting tube; thus by the longitudinal supporting tubes, the four transversal supporting tubes can be assembled as a rectangular upper frame and the four longitudinal supporting tubes being assembled as legs of the upper frame.

3 Claims, 5 Drawing Sheets

SUPPORTING FRAME

FIELD OF THE INVENTION

The present invention relates to supporting frames which are used for desks, chairs, receiving boxes, storage tanks, kitchen cabinets, etc. with a simple structure which can be assembled easily and conveniently,

BACKGROUND OF THE INVENTION

Generally, the frames of desks and chairs, supporting frames, receiving frames, kitchen cabinets are based on the environments locating the frames so that these furniture are made as an integral merchandize. However, recently, under new concepts, the frames are designed as assembled and foldable elements for selling and transportation. This is because the conventional structure has a large volume and thus they are not suitable for transportation. Furthermore, if parts of these frames are destroyed, these improved designs are helpful in updating. Furthermore, the foldable structure is suitable for stacking a plurality of basic units with a small volume.

However, the inventors have referred to many kinds of the conventional and newly designs, but the inventor discovers that these designs still have the defects of occupying large volumes, high cost, and large stacking volumes and the inventor discovers that these defects are improvable.

SUMMARY OF THE PRESENT INVENTION

Accordingly, the primary object of the present invention is to provide a supporting frame, wherein the assembly work of the supporting frame can be performed by users; the elements of the present invention can be updated and maintained easily; the frames are assembled by basic units so that the cost can be downed and the stock required is low; all the elements can be detached and assembled easily and quickly so that the work for transportation is simplified; the structure of the present invention is concrete.

To achieve above object, the present invention provides a supporting frame which comprises four transversal supporting tubes, each of the transversal supporting tubes having two hollow ends; each two adjacent inner faces of each transversal supporting tube being formed with a screw hole; four longitudinal supporting tubes, each upper end of the longitudinal supporting tubes being a hollow end; moreover, each two adjacent inner faces of each longitudinal supporting tube being formed with respective screw hole; and a plurality of three-way internal connecting units; each three-way internal connecting unit having three inserting ends; each inserting end of the three-way internal connecting unit can be inserted into the hollow ends of the transversal supporting tube and the longitudinal supporting tube; thus by the longitudinal supporting tubes, the four transversal supporting tubes can be assembled as a rectangular upper frame and the four longitudinal supporting tubes being assembled as legs of the upper frame.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
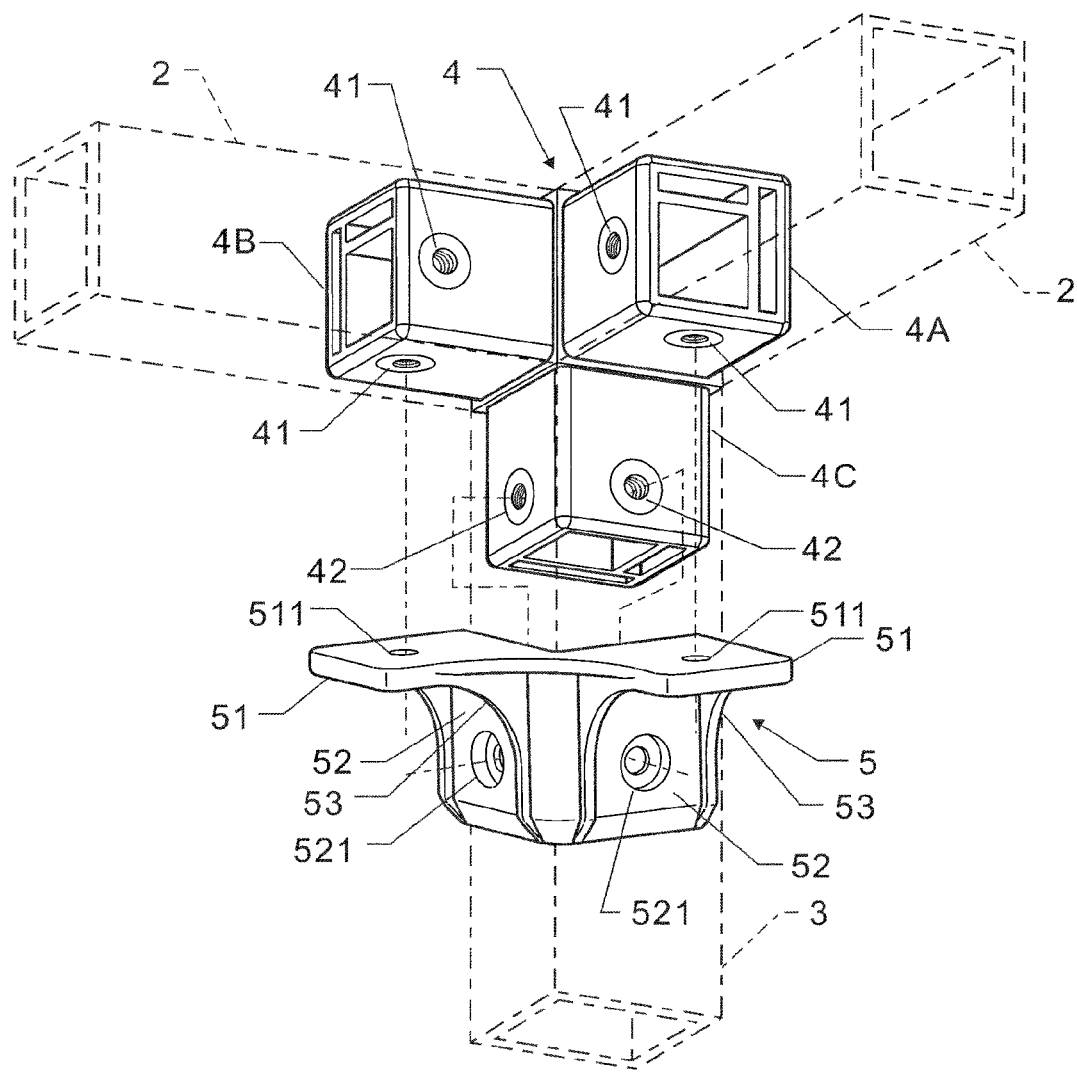
FIG. 1 shows the embodiment of the present invention.
Figure 2:
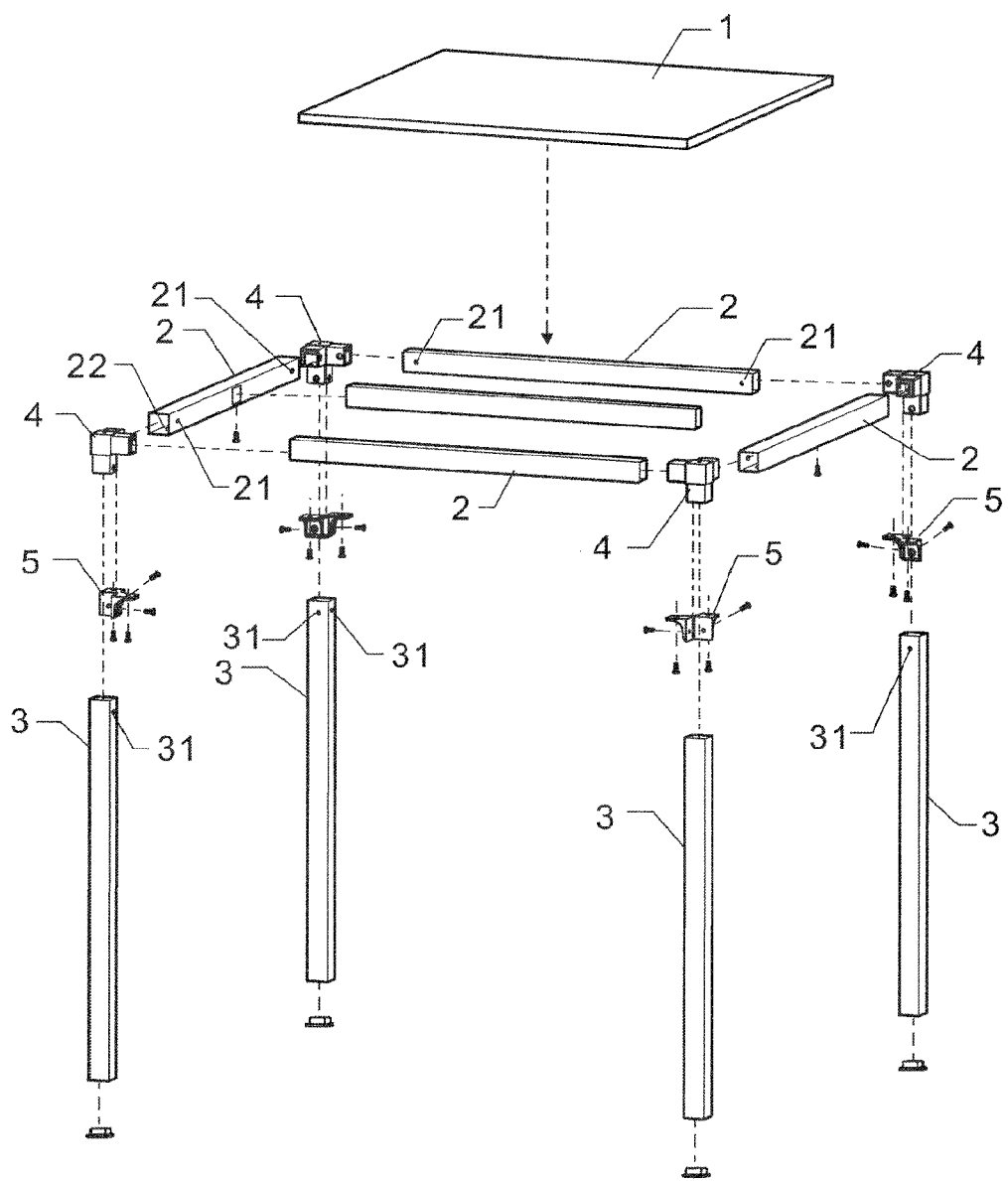
FIG. 2 is an exploded perspective view of the present invention.
Figure 3:
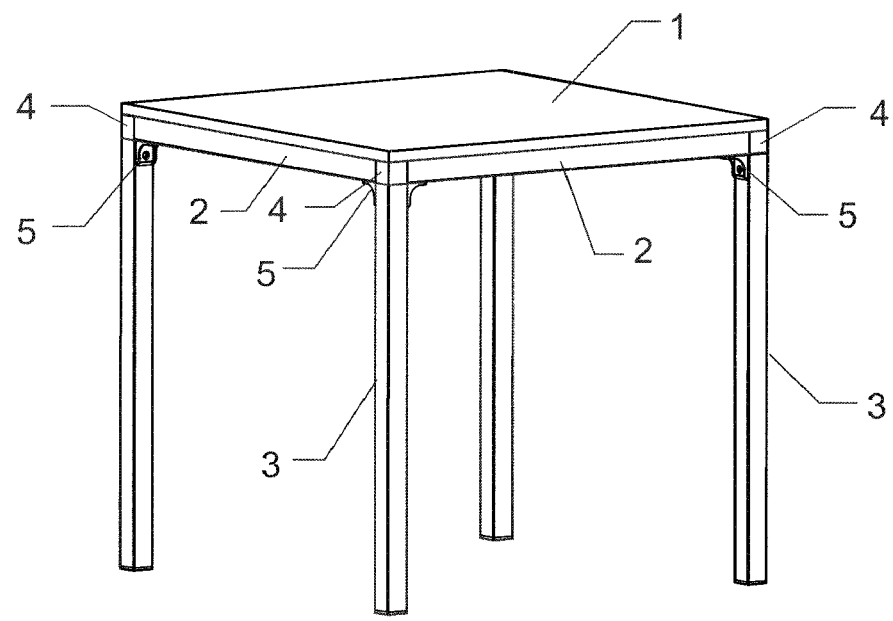
FIG. 3 is an assembled view of the present invention.
Figure 4:
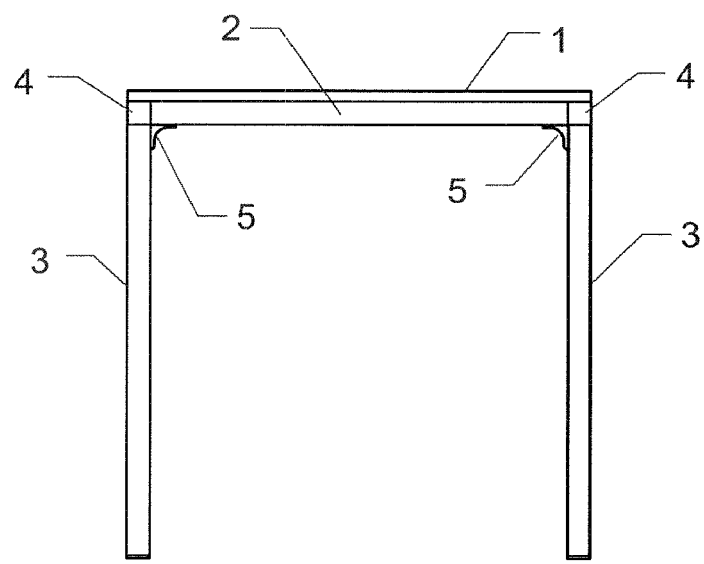
FIG. 4 is another assembled view of the present invention.

With reference to FIG. 1, the frame structure of the present invention is illustrated. The feature of the present invention is that a three ways internal connecting elements and enhancing fixtures of the present invention can be widely used as table frames, chair frames, receiving frames, kitchen cabinets, etc. Referring to FIGS. 2 to 4, the structure of the present invention will be described with reference to the drawings. In the following, a desk is used for description, but it is not used to confine the scope of the present invention.

Figure 5:
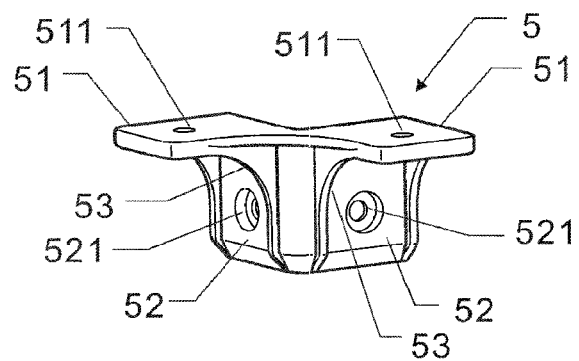
FIG. 5 is a perspective view showing the enhancing fixing unit of the present invention.
Figure 8:
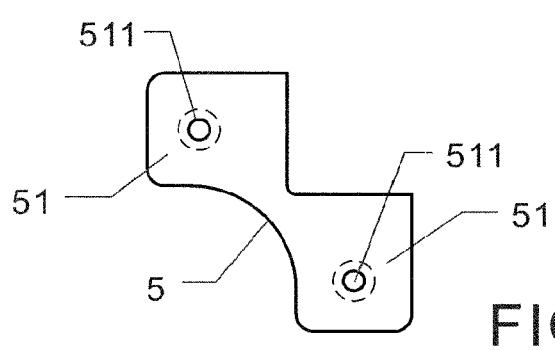
FIG. 8 is a left side view of the enhancing fixing unit shown in FIG. 5.
Figure 6:
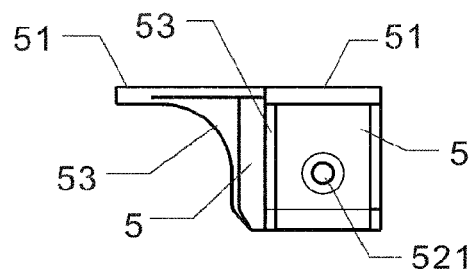
FIG. 6 is an elevational view of the enhancing fixing unit shown in FIG. 5.
Figure 7:
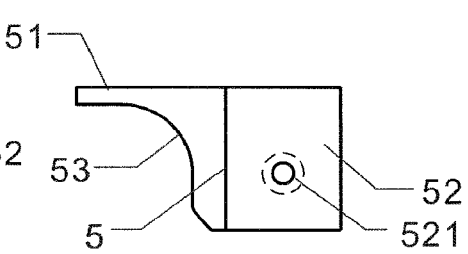
FIG. 7 is a right side view of the enhancing fixing unit shown in FIG. 5.
Figure 9:
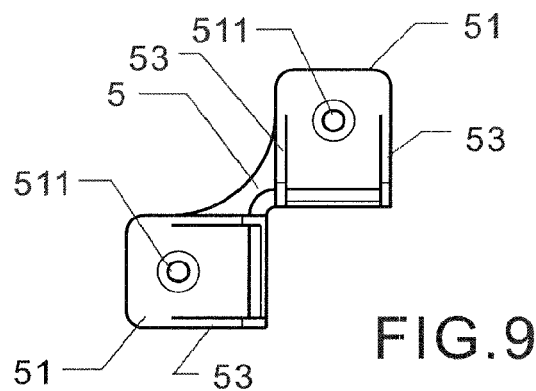
FIG. 9 is an upper view of the enhancing fixing unit shown in FIG. 5.
Figure 10:
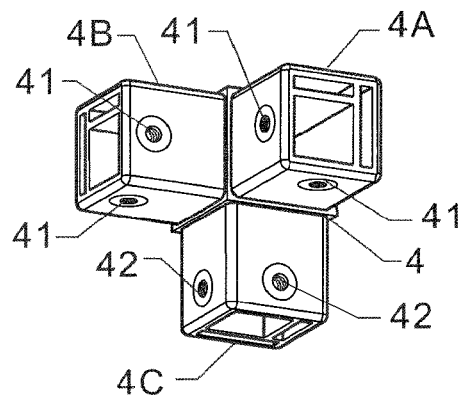
FIG. 10 is a perspective view of the three-way internal connecting unit of the present invention.
Figure 11:
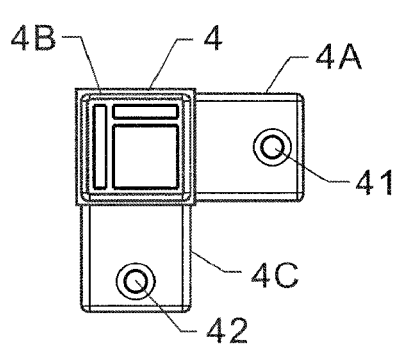
FIG. 11 is a right side view of the three-way internal connecting unit shown in FIG. 10.
Figure 12:
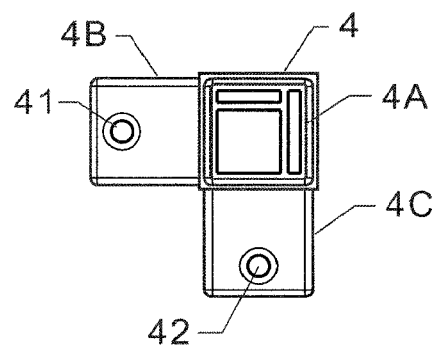
FIG. 12 is a left side view of the three-way internal connecting unit shown in FIG. 10.
Figure 13:
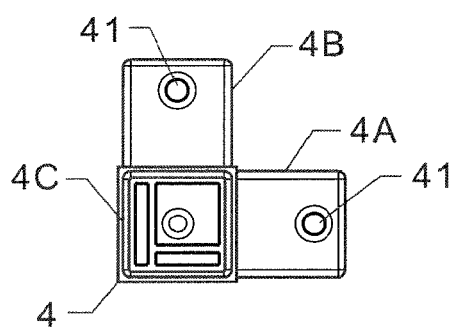
FIG. 13 is a lower side view of the three-way internal connecting unit shown in FIG. 10.

With reference to FIG. 1, the present invention includes the following elements of:

four transversal supporting tubes 2, each of the transversal supporting tubes 2 having two hollow ends; moreover, each two adjacent inner faces of each transversal supporting tube 2 being formed with respective screw holes 21, 22;

four longitudinal supporting tubes 3, each upper end of the longitudinal supporting tubes 3 being a hollow end; moreover, each two adjacent inner faces of each longitudinal supporting tube 3 being formed with respective screw hole 31, 32;

a plurality of three-way internal connecting units 4; each three-way internal connecting unit 4 having three inserting ends; each inserting end of the three-way internal connecting unit 4 can be inserted into the hollow ends of the transversal supporting tube 2 and the longitudinal supporting tube 3; every two ends of the longitudinal supporting tube 3 being formed with an angle of 90 degrees; thus by the longitudinal supporting tubes 3, the four transversal supporting tubes 2 can be assembled as a rectangular upper frame and the four longitudinal supporting tubes 3 being assembled as legs of the upper frame as illustrated in FIG. 3; FIGS. 3 and 4 showing the assembly view of the present invention;

referring to FIG. 2, a middle section of one inner side of the transversal supporting tube 2 can be formed with a receiving hole for receiving an enhancing bar;

referring to FIGS. 10, 11, 12 and 13, the structure of the three-way internal connecting unit 4 being illustrated; each three-way internal connecting unit 4 being formed by three rectangular ends 4A, 4B and 4C; each end having a hollow inner space; each two inner faces of the rectangular ends of the three-way internal connecting unit 4 being formed with three holes 41, 42;

a plurality of enhancing fixing units 5; referring to FIGS. 5 to 9, each enhancing fixing unit 5, as illustrated in FIG. 5, being by two connected lower rectangular sheets 52 which is connected with an angle of 90 degrees therebetween; each upper end of the lower rectangular sheet 52 being extended with an upper rectangular sheet 51. Each of the lower rectangular sheets 52 and upper rectangular sheets 51 has a respective screw hole 521, 511. Two parallel sides of each lower rectangular sheets 52 are formed with protruding rims 53; wherein in assembling, two inner sides of the lower rectangular sheets 52 will adhere to inner faces of each longitudinal supporting tube 3 and upper surfaces of the upper rectangular sheets 51 adhere to lower surfaces of respective transversal supporting tubes 2. Then as illustrated in FIG. 2, screws are used to lock the enhancing fixing unit 5 to the respective longitudinal supporting tube 3 and respective transversal supporting tubes 2 by the screw to pass through the screw holes of the longitudinal supporting tube 3, transversal supporting tubes 2 and three-way internal connecting unit 4.

Advantage of the present invention will be described herein. The assembly work can be performed by users; the elements of the present invention can be updated and maintained easily; the frames are assembled by basic units so that the cost can be downed and the stock required is low; all the elements can be detached and assembled easily and quickly so that the work for transportation is simplified; and moreover, the structure of the present invention is concrete.

The present invention is thus described, it will be obvious that the same may be varied in many ways. For example, the slot 11, 12 can be formed directly to the pillar; the pushing head 46 of the tightening unit 4 can be formed like a saddle capable of sitting across the water blocking sheet for better stability. Such variations are not to be regarded as a departure from the spirit and scope of the present invention, and all such modifications as would be obvious to one skilled in the art are intended to be included within the scope of the following claims.

What is claimed is:

1. A supporting frame, comprising:
    four transversal supporting tubes, each of the transversal supporting tubes having two hollow ends; each two adjacent inner faces of each transversal supporting tube being formed with a screw hole;
    four longitudinal supporting tubes, each upper end of the longitudinal supporting tubes being a hollow end; moreover, each two adjacent inner faces of each longitudinal supporting tube being formed with respective screw hole; and
    a plurality of three-way internal connecting units; each three-way internal connecting unit having three inserting ends; each inserting end of the three-way internal connecting unit can be inserted into the hollow ends of the transversal supporting tube and the longitudinal supporting tube; thus by the longitudinal supporting tubes, the four transversal supporting tubes can be assembled as a rectangular upper frame and the four longitudinal supporting tubes being assembled as legs of the upper frame; and
    wherein each three-way internal connecting unit is formed by three rectangular ends; each end having a hollow inner space; each two inner faces of the rectangular ends of the three-way internal connecting unit being formed with three holes; a plurality of enhancing fixing units; each enhancing fixing unit is formed by two connected lower rectangular sheets which is connected with an angle of 90 degrees therebetween; each upper end of the lower rectangular sheet is extended with an upper rectangular sheet; each of the lower rectangular sheets and upper rectangular sheets has a respective screw hole; two parallel sides of each lower rectangular sheets are formed with protruding rims; wherein in assembling, two inner sides of the lower rectangular sheets will adhere to inner faces of each longitudinal supporting tube and upper surfaces of the upper rectangular sheets adhere to lower surfaces of respective transversal supporting tubes; then screws are used to lock the enhancing fixing unit to the respective longitudinal supporting tube and respective transversal supporting tubes by the screw to pass through the screw holes of the longitudinal supporting tube, the transversal supporting tubes and the three-way internal connecting unit.

2. The supporting frame as claimed in claim 1, wherein every two ends of the longitudinal supporting tube is formed with an angle of 90 degrees.

3. The supporting frame as claimed in claim 1, wherein a middle section of one inner side of the transversal supporting tube is formed with a receiving hole for receiving an enhancing bar.

* * * * *